United States Patent
Lee et al.

(10) Patent No.: US 11,181,768 B2
(45) Date of Patent: Nov. 23, 2021

(54) POLARIZING PLATE, DISPLAY DEVICE WITH THE POLARIZING PLATE, AND METHOD OF MANUFACTURING THE DISPLAY DEVICE

(71) Applicant: Samsung Display Co., Ltd., Yongin-si (KR)

(72) Inventors: Sang-Gil Lee, Seoul (KR); Byung-Gon Kum, Suwon-si (KR); Eun Guk Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 322 days.

(21) Appl. No.: 15/859,710

(22) Filed: Jan. 1, 2018

(65) Prior Publication Data

US 2019/0025640 A1 Jan. 24, 2019

(30) Foreign Application Priority Data

Jul. 18, 2017 (KR) ......................... 10-2017-0090994

(51) Int. Cl.
*G02F 1/1335* (2006.01)
*G02F 1/1333* (2006.01)
*G02F 1/1337* (2006.01)
*G02F 1/1343* (2006.01)
*G02F 1/13357* (2006.01)

(52) U.S. Cl.
CPC ...... *G02F 1/133528* (2013.01); *G02F 1/1337* (2013.01); *G02F 1/1343* (2013.01); *G02F 1/133345* (2013.01); *G02F 1/133617* (2013.01); *C09K 2323/031* (2020.08); *C09K 2323/05* (2020.08)

(58) Field of Classification Search
CPC ......... G02F 1/133345; G02F 1/133528; G02F 1/133617; G02F 1/1337; G02F 1/1343; Y10T 428/1041; Y10T 428/105; Y10T 428/1077; C09K 2323/031; C09K 2323/05; C09K 2323/057
See application file for complete search history.

(56) References Cited

U.S. PATENT DOCUMENTS

2005/0233595 A1* 10/2005 Choi ...................... C23C 16/345
438/778
2006/0251844 A1* 11/2006 Choi .................... G02B 5/3025
428/40.1
(Continued)

FOREIGN PATENT DOCUMENTS

KR 10-1376755 3/2014
KR 10-2016-0086739 7/2016
(Continued)

*Primary Examiner* — Sophie Hon
*Assistant Examiner* — Sow-Fun Hon
(74) *Attorney, Agent, or Firm* — H.C. Park & Associates, PLC

(57) ABSTRACT

A display device includes a display panel; a color conversion display panel overlapping the display panel; and a polarizing plate positioned between the display panel and the color conversion display panel, wherein the polarizing plate may include a polarization film and a transfer layer overlapping the polarization film, the transfer layer may be positioned between the polarization film and the display panel, and the transfer layer may include an acrylamide-based compound.

11 Claims, 10 Drawing Sheets

(56) References Cited

U.S. PATENT DOCUMENTS

| | | | | |
|---|---|---|---|---|
| 2009/0041955 A1* | 2/2009 | Choi | ............... | C07C 229/60 |
| | | | | 428/1.26 |
| 2009/0091689 A1* | 4/2009 | Rho | ............... | C09K 11/54 |
| | | | | 349/69 |
| 2009/0185271 A1* | 7/2009 | Yaegashi | ............... | G02B 1/04 |
| | | | | 359/489.2 |
| 2015/0055219 A1* | 2/2015 | Kim | ............... | C08F 220/18 |
| | | | | 359/489.07 |
| 2016/0217723 A1 | 7/2016 | Kim et al. | | |
| 2016/0217732 A1 | 7/2016 | Kim et al. | | |
| 2016/0289513 A1* | 10/2016 | Behling | ............... | C09J 133/10 |
| 2017/0307781 A1* | 10/2017 | Lee | ............... | C08L 1/10 |

FOREIGN PATENT DOCUMENTS

| | | | |
|---|---|---|---|
| KR | 10-2016-0092129 | 8/2016 | |
| KR | 10-2016-0092131 | 8/2016 | |
| KR | 10-1676894 | 11/2016 | |
| WO | WO-2016052951 A * | 4/2016 | ........... G02B 5/3025 |

* cited by examiner

POLARIZING PLATE, DISPLAY DEVICE WITH THE POLARIZING PLATE, AND METHOD OF MANUFACTURING THE DISPLAY DEVICE

CROSS-REFERENCE TO RELATED APPLICATION

This application claims priority from and the benefit of Korean Patent Application No. 10-2017-0090994, filed on Jul. 18, 2017, which is hereby incorporated by reference for all purposes as if fully set forth herein.

BACKGROUND

Field

Exemplary embodiments relate to a polarizing plate including an acryl-based transfer layer, a display device with the polarizing plate, and a method of manufacturing the display device.

Discussion of the Background

A liquid crystal display used as a display device includes two field generating electrodes, a liquid crystal layer, a color filter, a polarizing plate, etc. Light loss occurs at the polarizing plate and the color filter of the liquid crystal display. Accordingly, a liquid crystal display that may reduce light loss and include a color conversion layer for realizing high efficiency has been suggested.

In the liquid crystal display including the color conversion layer, a polarizing plate is positioned between a color conversion display panel and a display panel. Although a wire grid polarizing plate (WGP) is used as the polarizing plate, light leakage may occur due to a defective pattern thereof, and it requires a planarization layer for planarization.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a polarizing plate that may reduce light leakage and be simply manufactured, a display device with the polarizing plate, and a method for manufacturing the display device.

Additional aspects will be set forth in the detailed description which follows, and, in part, will be apparent from the disclosure, or may be learned by practice of the inventive concepts.

An exemplary embodiment of a polarizing plate includes: a polarization film; a passivation layer overlapping the polarization film; a transfer layer overlapping the passivation layer; a first adhesive layer positioned between the polarization film and the passivation layer; and a second adhesive layer positioned between the passivation layer and the transfer layer, wherein the transfer layer includes a compound represented by Chemical Formula 1.

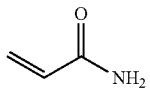

Chemical Formula 1

A thickness of the transfer layer may be 2 μm to 5 μm.

A thickness of the polarizing plate may be 30 μm to 50 μm.

Another exemplary embodiment provides a display device including: a display panel; a color conversion display panel overlapping the display panel; and a polarizing plate positioned between the display panel and the color conversion display panel, wherein the polarizing plate may include a polarization film and a transfer layer overlapping the polarization film, the transfer layer may be positioned between the polarization film and the display panel, and the transfer layer may include an acrylamide-based compound.

The transfer layer may include a compound represented by Chemical Formula 1.

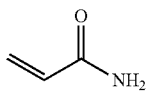

Chemical Formula 1

A thickness of the polarizing plate may be 30 μm to 50 μm.

A thickness of the transfer layer may be 2 μm to 5 μm.

The display panel may include: a first substrate; a first electrode positioned at the first substrate; a barrier film facing the first substrate; a second electrode positioned on the barrier film; a liquid crystal layer positioned between the first electrode and the second electrode; a first alignment layer positioned between the first electrode and the liquid crystal layer; and a second alignment layer positioned between the second electrode and the liquid crystal layer, wherein the barrier film may be positioned between the second electrode and the transfer layer.

The barrier film may include a silicon nitride or a silicon oxide.

The second alignment layer may be cured at a temperature of 200 degrees Celsius or more.

Yet another embodiment provides a method of manufacturing a display device, including: coating and curing a transfer layer on a carrier substrate; sequentially forming a barrier film, a second electrode, and a second alignment layer on the transfer layer; removing the carrier substrate; and attaching a polarizing plate including a polarization film to the transfer layer exposed by removing of the carrier substrate, wherein the transfer layer may include an acrylamide-based compound, and a second display panel and the polarizing plate may be manufactured through the steps as a single process.

The transfer layer may include a compound represented by Chemical Formula 1.

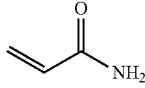

Chemical Formula 1

The method of manufacturing the display device may further include: forming a first electrode at a first substrate; manufacturing a first display panel by forming a first alignment layer on the first electrode; laminating the first display panel, the second display panel, and the polarizing plate; and forming a liquid crystal layer between the first display panel and the second display panel.

The method of manufacturing the display device may further include positioning a color conversion display panel on the polarizing plate.

The second alignment layer may be cured at a temperature of 220 to 240 degrees Celsius for 900 to 1200 seconds.

In the coating and curing of the transfer layer on the carrier substrate, the transfer layer may be in close contact with the carrier substrate, and no laser may be used in the removing of the carrier substrate.

The removing of the carrier substrate may be performed through a process of attaching a passivation film on the second alignment layer.

A thickness of the transfer layer may be 2 µm to 5 µm.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
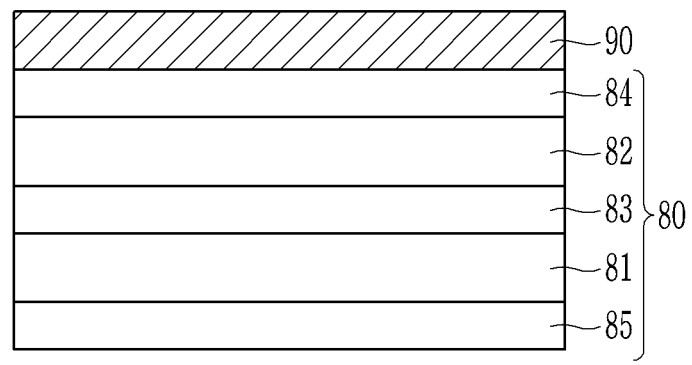
FIG. 1 is a cross-sectional view of a polarizing plate according to an exemplary embodiment of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Throughout the specification, the phrase "on a plane" means viewing the object portion from the top, and the phrase "on a cross-section" means viewing a cross-section of which the object portion is vertically cut from the side.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not necessarily intended to illustrate the actual shape of a region of a device and may not be intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a cross-sectional view of a polarizing plate according to an exemplary embodiment. Referring to FIG. 1, a polarizing plate 800 according to the present exemplary embodiment includes a polarization film 81 containing PVA (polyvinyl alcohol), a passivation layer 82 overlapping the polarization film, a transfer layer 90 overlapping the passivation layer 82, a first adhesive layer 83 positioned between the polarization film 81 and the passivation layer 82, and a second adhesive layer 84 positioned between the passivation layer 82 and the transfer layer 90, and the transfer layer 90 includes an acrylamide-based compound. A third adhesive layer 85 may be positioned on one surface of the polarization film 81.

Referring to FIG. 1, the polarizing plate 800 according to an exemplary embodiment may be divided into a polarization region 80 having a polarization function and the transfer layer 90. The polarization region 80 includes the polarization film 81, the passivation layer 82, the first adhesive layer 83, the second adhesive layer 84, and the third adhesive layer 85.

The polarizing plate 800 according to the exemplary embodiment includes the transfer layer 90 containing an acrylamide-based compound. Therefore, when the polarizing plate 800 is applied to a display device, the polarization region 80 may be easily detached and attached because of the transfer layer 90. In particular, a laser process or the like is not used for detaching, so that processes may be simplified. In addition, the transfer layer 90 is suitable because characteristics thereof are not changed even at a high temperature during an alignment layer process, and the polarizing plate 800 and a second display panel to be applied to a display panel later may be manufactured by a single process.

That is, since the polarizing plate 800 according to the exemplary embodiment includes the transfer layer 90 with an acrylamide compound is disposed on one side of the polarizing plate, it is possible to simplify the manufacturing process thereof, and since the polarization film 81 containing PVA is used as a polarization layer, it is possible to prevent lateral light leakage and omit a planarization process and the like.

The transfer layer 90 may include an acrylamide-based compound, and particularly, the transfer layer 90 may include a polymer compound including or made by including a monomer represented by Chemical Formula 1.

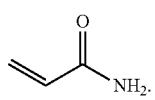

Chemical Formula 1

The compound represented by Chemical Formula 1 may be acrylamide, and the polymer compound may have a molecular weight of about 71.08 g/mol, a density of about 1.13 g/cm$^3$, a glass transition temperature of about 170 degrees Celsius to about 250 degrees Celsius, a refractive index of about 1.430, and transmittance of about 95.5% for a wavelength of 550 nm.

An acryl-based resin contained in the transfer layer 90 has a weak physical interaction with functional groups such as Si, O, and OH present on a surface of a glass substrate. Accordingly, since the acryl-based resin contained in the transfer layer 90 is weakly combined to the glass substrate, when the glass substrate is to be separated and removed from the transfer layer 90 adhered thereto, it may be simply separated and removed without use of a large amount of energy, such as laser energy.

A thickness of the transfer layer 90 may be 2 μm to 5 μm. When the thickness of the transfer layer 90 is less than 2 μm, it may not have a sufficient adhesive characteristic, and when the thickness of the transfer layer 90 is greater than 5 μm, the entire polarizing plate becomes thick, which is not preferable.

The thickness of the polarizing plate 800 shown in FIG. 1 may be 30 μm to 50 μm. When the thickness of the polarizing plate is less than 30 μm, it does not have a sufficient polarization characteristic, and when the thickness of the polarizing plate is greater than 50 μm, problems of a light path may be caused in a case where the polarizing plate is subsequently applied between a display panel and a color conversion display panel.

In FIG. 1, a thickness of the polarization film 81 containing the PVA may be about 6 μm to about 8 μm. The polarization film 81 is a part that substantially induces polarization of light, and since it is made of a film, lateral light leakage does not occur and a planarization process is not required. The passivation layer 82 may protect the polarization film 81 from external impact. The first adhesive layer 83, the second adhesive layer 84, and the third adhesive layer 85 bond the elements forming the polarization region 80 to each other, and may include, for example, the PSA. Alternatively, at least one of the first adhesive layer 83, the second adhesive layer 84, and the third adhesive layer 85 may contain reusable PSA.

Thicknesses of the first adhesive layer 83 and the third adhesive layer 85 may be about 3 μm to about 7 μm. However, a thickness of the second adhesive layer 84 may be equal to or less than 1 μm. This is because the polarization film 81 and the passivation layer 82 should closely contact each other in order for the passivation layer 82 to protect the polarization film 81.

Figure 2:
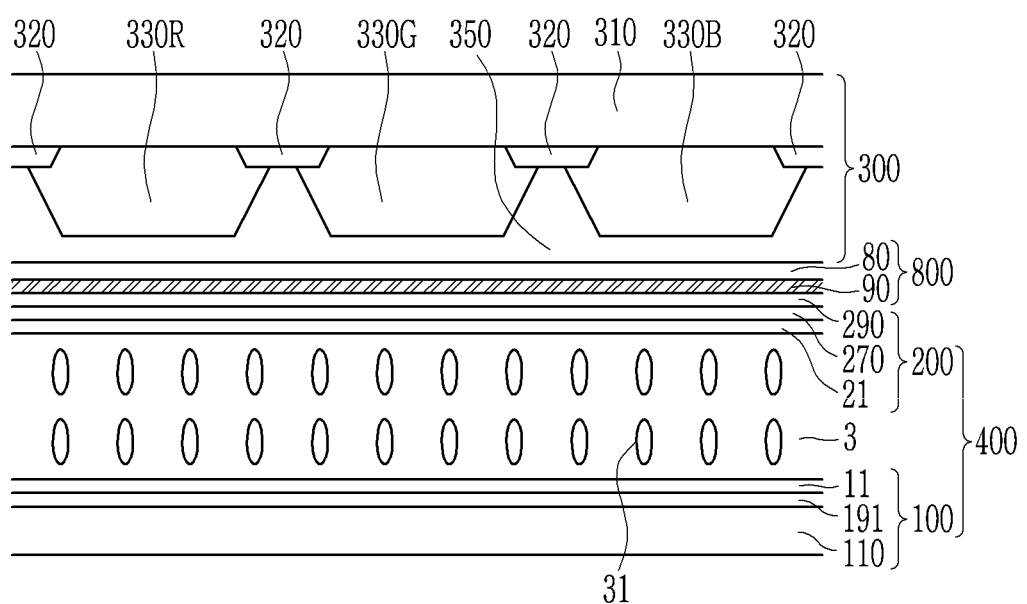
FIG. 2 is a schematic view of a display device according to an exemplary embodiment.

Hereinafter, a case where the polarizing plate 800 is applied to a display device according to an exemplary embodiment will be described with reference to the accompanying drawings. FIG. 2 is a schematic view of a display device according to an exemplary embodiment.

Referring to FIG. 2, the display device according to the exemplary embodiment includes a display panel 400, a color conversion display panel 300 positioned on the display panel 400, and the polarizing plate 800 positioned between the display panel 400 and the color conversion display panel 300. The polarizing plate 800 includes the polarization region 80 including the polarization film containing the PVA, and the transfer layer 90. The transfer layer 90 is positioned between the polarization region 80 and the display panel 400. The transfer layer 90 includes the acrylamide-based compound.

Although the polarizing plate 800 in FIG. 2 is simply shown as including the polarization region 80 and the transfer layer 90, the description of the polarizing plate 800 in FIG. 1 also applies to FIG. 2. The polarization region 80 in FIG. 2 includes the polarization film 81, the passivation layer 82, the first adhesive layer 83, the second adhesive layer 84, and the third adhesive layer 85 shown in FIG. 1, and a detailed description of the same components will be omitted.

In the exemplary embodiment, the transfer layer 90 may include a compound represented by Chemical Formula 1.

A thickness of the transfer layer 90 may be about 2 μm to about 5 μm. A thickness of the polarizing plate 800 may be about 30 μm to about 50 μm.

Referring to FIG. 2, a first display panel 100 includes a first substrate 110, a first electrode 191 positioned on the first substrate 110, and a first alignment layer 11 positioned on the first electrode 191. The first display panel 100 may be a lower display panel.

In addition, a second display panel 200 includes a barrier film 290, a second electrode 270 positioned at the barrier film 290, and a second alignment layer 21 positioned between the second electrode 270 and a liquid crystal layer 3. The second display panel may be an upper display panel.

That is, the second display panel 200 does not include a separate substrate corresponding to the first substrate 110, and the second electrode 270 is positioned at the barrier film 290. This is because the substrate is separated and removed during a process of attaching the polarizing plate 800 and the second electrode 270, and a specific manufacturing method thereof will be described later.

Referring to FIG. 2, the barrier film 290 is positioned between the transfer layer 90 and the second electrode 270. The barrier film 290 may include a silicon nitride or a silicon oxide. The second electrode 270 may be a common electrode.

The color conversion display panel 300 is positioned at one side of the polarizing plate 800. The color conversion display panel 300 includes a substrate 310, a first color conversion layer 330R positioned at the substrate 310, a second color conversion layer 330G, a transmissive layer 330B, and light blocking layers 320 positioned between the first color conversion layer 330R and the second color conversion layer 330G, between the second color conversion layer 330G and the transmissive layer 330B, and between the transmissive layer 330B and the first color conversion layer 330R. The color conversion layers 330R and 330G of the color conversion display panel 300 includes a quantum dot or a phosphor and converts incident blue light into red light or green light, and the transmissive layer 330B transmits the incident blue light.

A planarization layer 350 is positioned between the first color conversion layer 330R, second color conversion layer 330G, and transmissive layer 330B, and the polarizing plate 800. The planarization layer 350 fills spaces between the first color conversion layer 330R and the second color conversion layer 330G, between the second color conversion layer 330G and the transmissive layer 330B, and between the transmissive layer 330B and the first color conversion layer 330R, and provides a flat surface.

Referring to FIG. 1 and FIG. 2, in the display device according to the exemplary embodiment, the polarizing plate 800 is positioned between the display panel 400 and the color conversion display panel 300, and the transfer layer 90 of the polarizing plate 800 is positioned to be adjacent to the display panel 400.

Since the polarization region 80 of the polarizing plate 800 includes the polarization film 81, the manufacturing process is simple and economical, and it is possible to reduce lateral light leakage compared to a polarization region using a wire grid polarizing plate. This is because in a case of the wire grid polarizing plate, a process error may occur in an etching process thereof, but the exemplary embodiment does not require an etching process because the polarization film 81 is used as the polarization layer.

In addition, although the wire grid polarizing plate requires a separate planarization layer, since the polarizing plate 800 according to the exemplary embodiment uses the polarization film 81, the separate planarization layer is not required in the polarizing plate 800.

Figure 3:
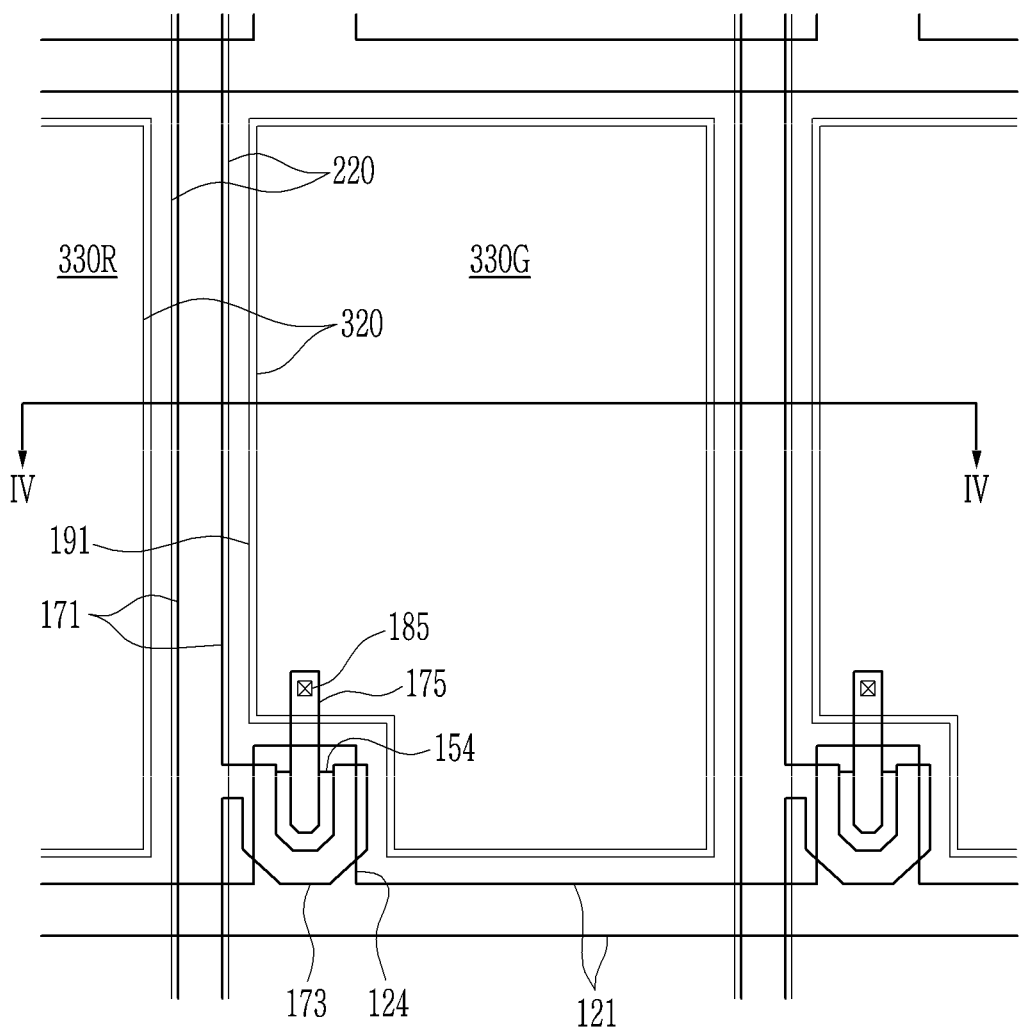
FIG. 3 is a layout view of a display device according to an exemplary embodiment.
Figure 4:
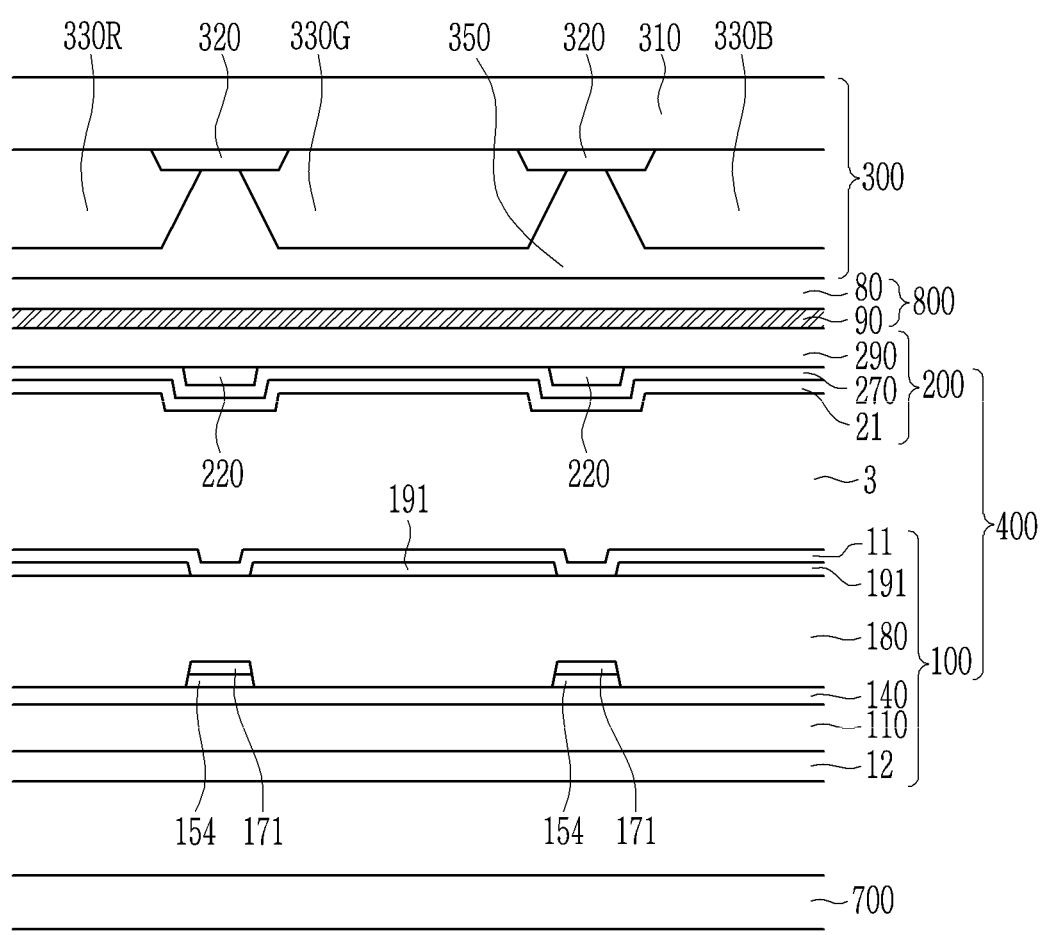
FIG. 4 is a cross-sectional view taken along line IV-IV of FIG. 3.

FIG. 3 is a layout view of a display device according to an exemplary embodiment, and FIG. 4 is a cross-sectional view taken along line IV-IV of FIG. 3. However, the shown structure of the display device is merely an example, and the display panel 400 may include only one substrate. Alternatively, the display panel 400 may be an emissive display device that does not include a liquid crystal.

Referring to FIG. 3 and FIG. 4, the display device according to the exemplary embodiment includes the display panel 400 and the color conversion display panel 300. In addition, a light unit 700 for supplying light to the display panel 400 and the color conversion display panel 300 is included. The light unit 700 may emit blue light, and may include a blue light emitting diode (LED). The light emitted from the light unit 700 is sequentially transmitted through the display panel 400 and the color conversion display panel 300, and then is emitted to the outside.

The display panel 400 includes the first display panel 100, the second display panel 200 overlapping the first display panel 100, and the liquid crystal layer 3 positioned between the first display panel 100 and the second display panel 200.

First, the first display panel 100 will be described. A gate conductor including a gate line 121 and a gate electrode 124 is positioned on one surface of the first substrate 110 made of transparent glass or plastic, and a first polarization layer 12 is positioned on another surface of the first substrate 110.

The gate line 121 may extend in a first direction. The gate conductor may include various metals or conductors, and may have a multi-layered structure.

A gate insulating layer 140 is positioned between the gate conductor and the liquid crystal layer 3. The gate insulating layer 140 may include an inorganic insulating material.

A semiconductor layer 154 is positioned on one surface of the gate insulating layer 140.

A data line 171 is positioned between the semiconductor layer 154 and the liquid crystal layer 3, and extends in a second direction to cross the gate line 121. A source electrode 173 may extend from the data line 171 and overlap the gate electrode 124. A drain electrode 175 is separated from the data line 171, and as shown in FIG. 3, it may be rod-shaped and extend toward a center of the source electrode 173.

Some of the semiconductor layer 154 may not overlap the data line 171 and the drain electrode 175 in a region between the source electrode 173 and the drain electrode 175. The semiconductor layer 154 may have substantially the same planar shape as the data line 171 and the drain electrode 175 except for the non-overlapping portion.

One gate electrode 124, one source electrode 173, and one drain electrode 175 form one thin film transistor together with the semiconductor layer 154, and a channel of the thin film transistor corresponds to a region of the semiconductor layer 154 between the source electrode 173 and the drain electrode 175.

A passivation layer 180 is positioned between the source electrode 173 and drain electrode 175, and the liquid crystal layer 3. The passivation layer 180 may include an inorganic insulating material, an organic insulating material, a low dielectric insulating material, etc., such as a silicon nitride or a silicon oxide.

The passivation layer 180 is provided with a contact hole 185 overlapping some of the drain electrode 175.

The first electrode 191 is positioned between the passivation layer 180 and the liquid crystal layer 3. The first electrode 191 is physically and electrically connected to the drain electrode 175 through the contact hole 185, and receives a data voltage from the drain electrode 175. The first electrode 191 may be a pixel electrode.

The first alignment layer 11 is positioned between the first electrode 191 and the liquid crystal layer 3.

The second display panel 200 includes the barrier film 290, a light blocking member 220, the second electrode 270, and the second alignment layer 21.

The transfer layer 90 of the polarizing plate 800 is positioned on one surface of the barrier film 290, and the second electrode 270 is positioned on another surface thereof. The second electrode 270 may be a common electrode.

The polarizing plate 800 includes the polarization region 80 and the transfer layer 90. Elements of the polarizing plate 800 are the same as in FIG. 1. A detailed description of the same components will be omitted. That is, the polarizing plate 800 includes a polarization film (not shown) containing PVA, and the transfer layer 90 including an acrylamide-based compound.

The light blocking member 220 is positioned between the barrier film 290 and the second electrode 270. The light blocking member 220 may overlap the data line 171, and may extend in the second direction. Although not shown, the light blocking member may further include a horizontal portion overlapping the gate line 121 and extending in the first direction.

The second alignment layer 21 is positioned between the second electrode 270 and the liquid crystal layer 3.

The color conversion display panel 300 includes the same elements and perform the same functions as described in FIG. 2. A detailed description of the same components will be omitted.

Hereinafter, a method of manufacturing the display device according to the exemplary embodiment will be described with reference to FIG. 5 to FIG. 10.

FIG. 5 to FIG. 10 illustrate a manufacturing method with process cross-sectional views according to an exemplary embodiment.

Figure 5:
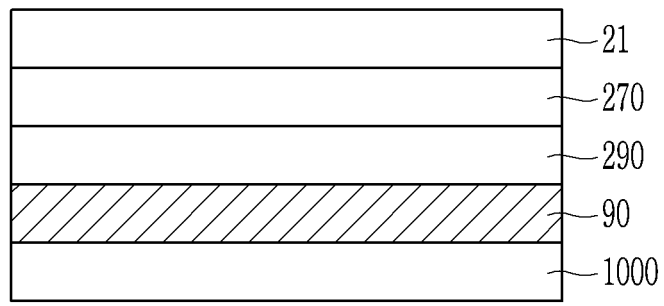
FIG. 5, FIG. 6, FIG. 7, FIG. 8, FIG. 9, and FIG. 10 are cross-sectional views of a manufacturing method according to an exemplary embodiment.

Referring to FIG. 5, the transfer layer 90, the barrier film 290, the second electrode 270, and the second alignment layer 21 are formed on a carrier substrate 1000.

First, the transfer layer 90 is coated on the carrier substrate 1000 made of glass to be cured. In this case, the transfer layer 90 may include an acrylamide-based compound. For example, the transfer layer 90 may include a compound represented by Chemical Formula 1.

As described above, the acrylamide-based compound of the transfer layer 90 and the functional groups on the surface of the carrier substrate 1000 made of glass are not chemically reacted but are only physically combined to each other. That is, the transfer layer 90 and the carrier substrate 1000 are combined by a physical pressure, and are also combined to each other by a weak physical interaction with the acrylic resin and Si, O, and OH existing on the glass surface. Accordingly, they may be easily separated.

In the present exemplary embodiment, a thickness of the transfer layer may be 2 μm to 5 μm.

Next, the barrier film 290, the second electrode 270, and the second alignment layer 21 are formed on the transfer layer 90. The barrier film 290 may include a silicon nitride or a silicon oxide. A thickness of the barrier film 290 may be about 1000 angstroms, but is not limited thereto.

The second electrode 270 is formed on the barrier film 290. The second electrode 270 may include a transparent conductive oxide such as ITO or IZO.

The second alignment layer 21 is formed on the second electrode 270. In a process of forming the second alignment layer 21, the second alignment layer 21 may be cured at a temperature of 200 degrees Celsius or more. For example, it may be cured at a temperature of 220 to 240 degrees Celsius for 900 to 1200 seconds. Alternatively, it may be cured at a temperature of 230 degrees Celsius for 1000 seconds.

Since the transfer layer 90 according to the exemplary embodiment includes an acrylamide-based compound, it is stable even at a high temperature. Accordingly, characteristics of the transfer layer 90 are not changed even in an alignment layer process at a high temperature.

Figure 6:
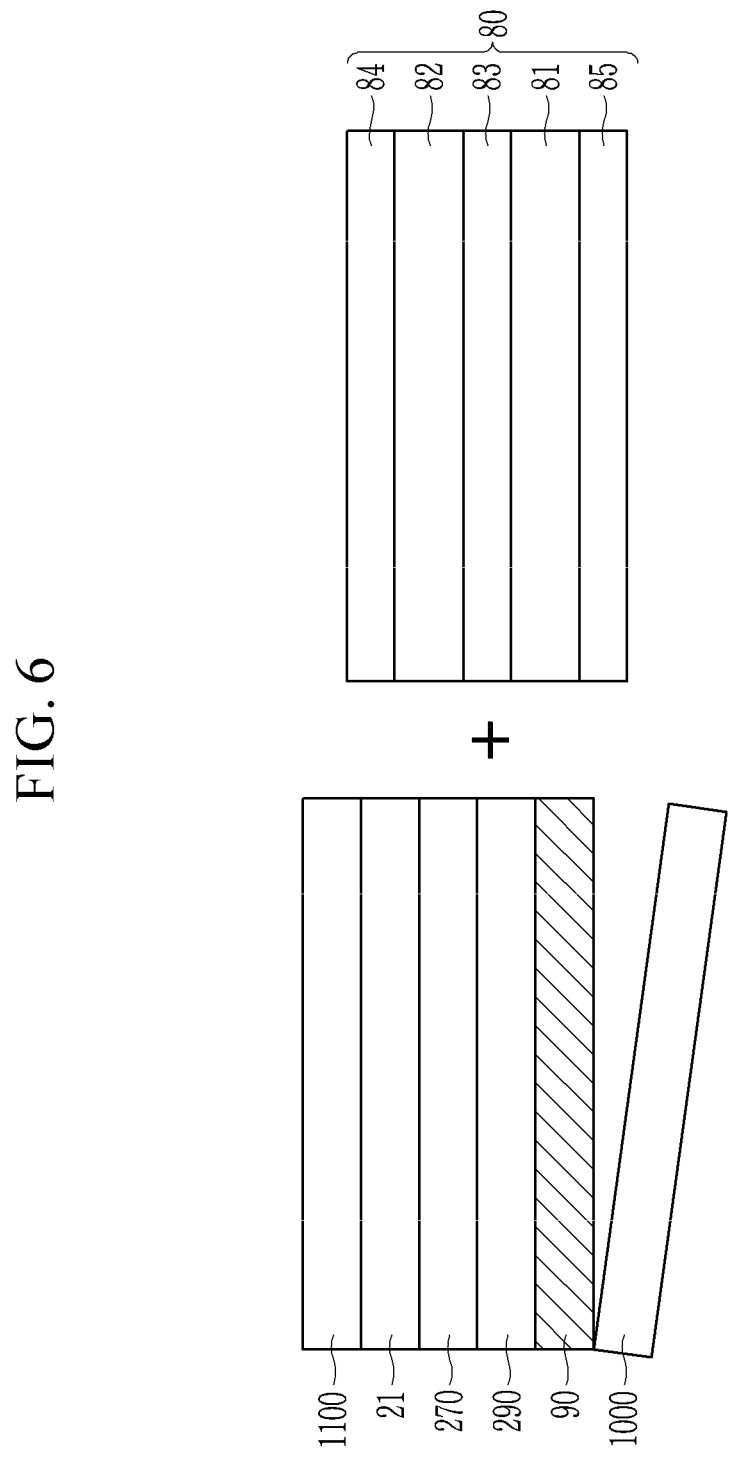

Referring to FIG. 6, in order to perform a method in which a passivation film 1100 is attached to the second alignment layer 21, the carrier substrate 1000 is separated and removed. As described above, since the physical connection between transfer layer 90 and the carrier substrate 1000 is weak, the carrier substrate 1000 may be separated from the transfer layer 90 merely by attaching the passivation film 1100 to the second alignment layer 21.

This is because the combined force between the second alignment layer 21 and the passivation film 1100 is greater than the combined force between the transfer layer 90 and the carrier substrate 1000.

Therefore, since no laser is used to separate and remove the carrier substrate 1000, it is possible to prevent damage due to detachment failure by a laser, and improve the process to be simple and economical.

When the transfer layer 90 is made of a high heat-resistant polymer resin such as a polyamide or polyimide, the resin is completely cured and adhered to the carrier substrate 1000, so that a laser process is necessarily required for detaching. The laser process increases a process cost, and while the laser process is performed, foreign materials may enter therein or cracks may occur due to stress. That is, defects may occur in which the film is torn or foreign materials enter therein in the laser detaching process for separating the carrier substrate 1000 and the polymer resin. In addition, since the polyamide and polyimide are expensive, they are not suitable for mass production.

However, since in the method of manufacturing the display device according to the exemplary embodiment, the transfer layer 90 made of the acrylamide-based compound is used, it is stable not only in a high-temperature alignment layer process but may also be easily is separated and removed from the carrier substrate 1000.

Next, referring to FIG. 6, the polarization region 80 is attached to the transfer layer 90. As described with reference to FIG. 1, the polarization region 80 includes the polarization film 81, the passivation layer 82, the first adhesive layer 83, the second adhesive layer 84, and the third adhesive layer 85. A detailed description of the same components will be omitted.

Figure 7:
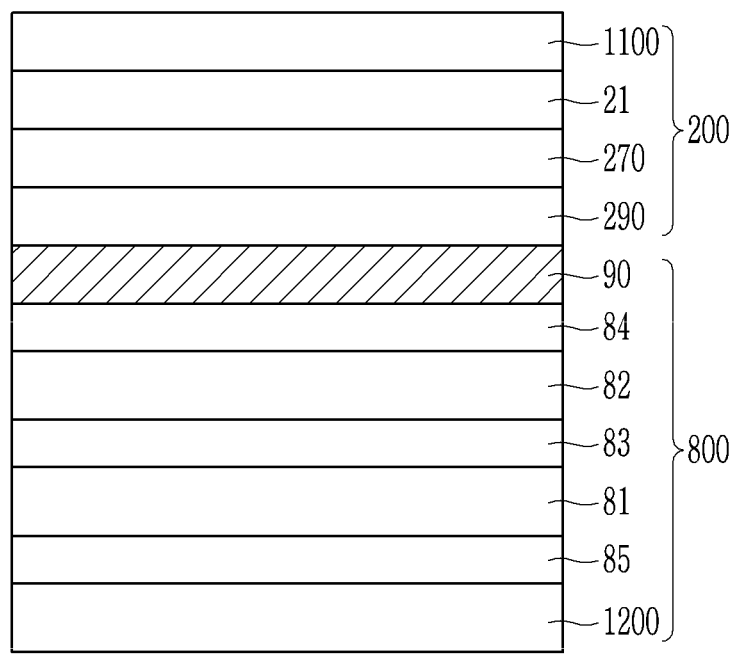

Through the attaching process, a structure shown in FIG. 7 is completed. Referring to FIG. 7, the display device includes the second display panel 200 and the polarizing plate 800. A release film 1200 may be additionally formed on one side of the polarizing plate 800.

The method of manufacturing the second display panel 200 and the polarizing plate 800 has been described. According to the exemplary embodiment, since the second display panel 200 and the polarizing plate 800 are manufactured by a single process, the process is less expensive than the traditional processes.

Figure 8:
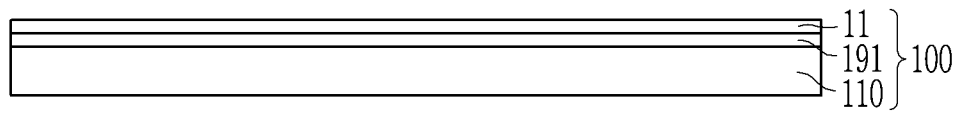

Further, referring to FIG. 8, the first display panel 100 may be manufactured by forming a first electrode 191, the first alignment layer 11, etc. on the first substrate 110.

Figure 9:
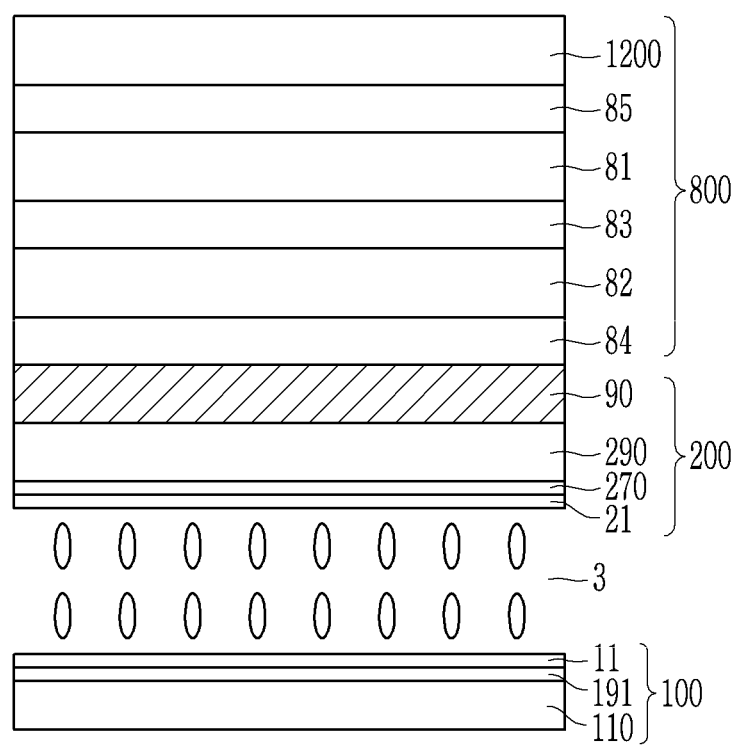

Next, referring to FIG. 9, the display panel may be manufactured by laminating the first display panel 100, the second display panel 200, and the polarizing plate 800 and then injecting liquid crystals therebetween. That is, the display panel and the polarizing plate 800 positioned on the display panel are manufactured.

In this case, in the laminating process, the passivation film 1100 contacting the second alignment layer 21 is removed. That is, since the passivation film 1100 serves to prevent damage to the second display panel 200 during transport for performing processes, it is removed in the laminating process.

Figure 10:
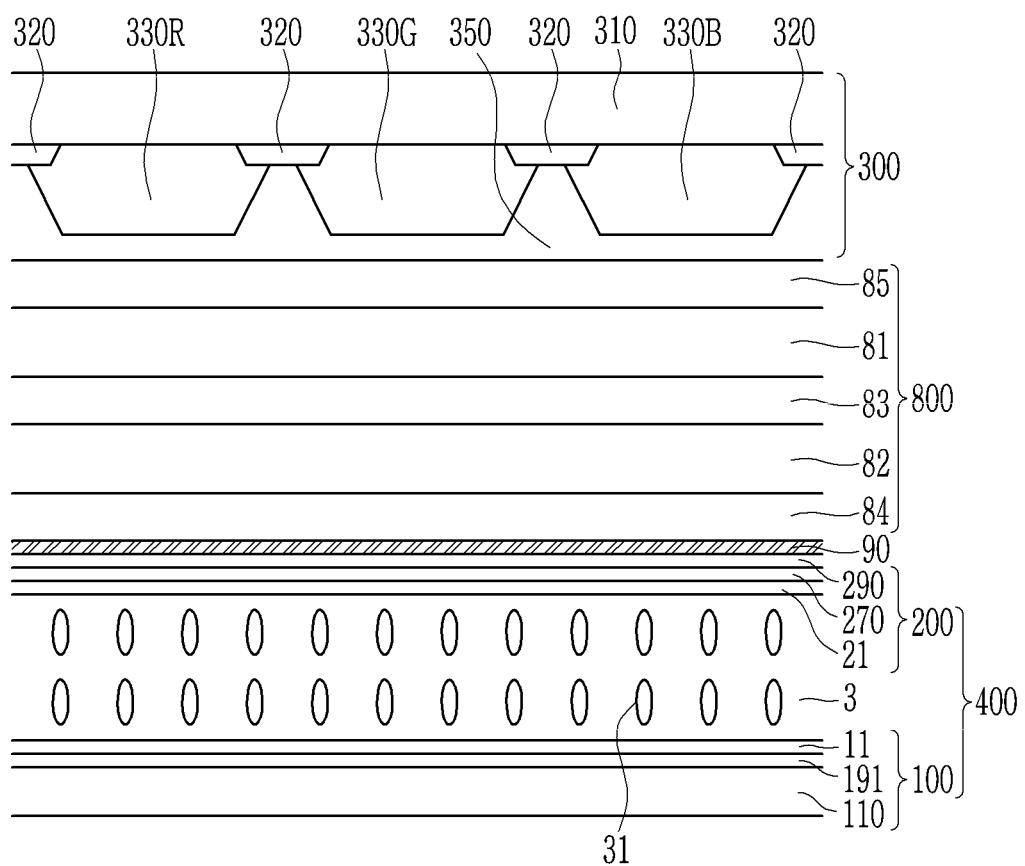

Next, referring to FIG. 10, the color conversion display panel 300 is manufactured, and the display device may be manufactured by combining the color conversion display panel 300 with the display panel 400 and the polarizing plate 800 manufactured described in FIG. 9. In this case, the release film 1200 positioned on one surface of the polarizing plate 800 is removed.

However, the above-described manufacturing method is merely an example, and the first display panel 100 or the color conversion display panel 300 may be manufactured by other methods known to those skilled in the art.

According to the manufacturing method according to an exemplary embodiment, it is possible to easily remove the carrier substrate 1000 by using the transfer layer 90 including the acrylamide-based compound, perform the alignment layer process at a high temperature, and manufacture the polarizing plate 800 and the second display panel 200 by a single process. Therefore, the processes are economical and the defects of the manufactured display device may be reduced.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A display device comprising:
   a display panel;
   a color conversion display panel overlapping the display panel; and
   a polarizing plate positioned between the display panel and the color conversion display panel,
   wherein the display panel comprises:
     a first substrate;
     a first electrode disposed on the first substrate;
     a barrier film having a thickness of about 1000 Å and facing the first substrate;
     a second electrode disposed directly on a first surface of the barrier film; and
     a liquid crystal layer positioned between the first electrode and the second electrode, and
   wherein the polarizing plate comprises:
     a polarization film;
     a transfer layer comprising an acrylamide-based compound and an acryl-based resin that has a weak physical interaction with Si, O and OH functional groups, disposed directly on a second surface of the barrier film, and overlapping the polarization film, the transfer layer having a thickness in a range of 2 μm to 5 μm,
     wherein the barrier film is positioned between the second electrode and the transfer layer;
     a protective layer disposed between the polarization film and the transfer layer;
     a first adhesive film directly disposed on a surface of the transfer layer facing the polarization film between the protective layer and the transfer layer; and
     a second adhesive film disposed between the protective layer and the polarization film, the second adhesive film having a thickness greater than that of the first adhesive film.

2. The display device of claim 1, wherein
the transfer layer comprises a polymer compound comprising a monomer represented by Chemical Formula 1:

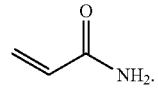

Chemical Formula 1

3. The display device of claim 1, wherein
a thickness of the polarizing plate is 30 μm to 50 μm.

4. The display device of claim 1, wherein the display panel further comprises:
   a first alignment layer positioned between the first electrode and the liquid crystal layer; and
   a second alignment layer positioned between the second electrode and the liquid crystal layer.

5. The display device of claim 4, wherein
the barrier film comprises a material selected from the group consisting of a silicon nitride and a silicon oxide.

6. The display device of claim 4, wherein
the second alignment layer is cured at a temperature of 200 degrees Celsius or more.

7. A method of manufacturing a display device, comprising:
   forming a first electrode on a first substrate;
   manufacturing a first display panel by forming a first alignment layer on the first electrode;
   coating and curing a transfer layer on a carrier substrate, the transfer layer having a thickness in a range of 2 μm to 5 μm;
   sequentially forming a barrier film having a thickness of about 1000 Å, a second electrode directly on a first surface of the barrier film, and a second alignment layer on the transfer layer;
   removing the carrier substrate to form a second display panel;
   attaching a polarizing plate comprising a polarization film and a protective layer through a first adhesive film to the transfer layer exposed by the removing of the carrier substrate, wherein the first adhesive film is directly disposed on a surface of the transfer layer facing the polarization film between the protective layer and the transfer layer, and a second adhesive film is disposed between the protective layer and the polarization film, the second adhesive film having a thickness greater than that of the first adhesive film, wherein the transfer layer comprises an acrylamide-based compound, and an acryl-based resin that has a weak physical interaction with Si, O and OH functional groups;

laminating the first display panel, the second display panel, and the polarizing plate;

forming a liquid crystal layer between the first display panel and the second display panel; and positioning a color conversion display panel on the polarizing plate.

8. The method of manufacturing the display device of claim 7, wherein the transfer layer comprises a compound represented by Chemical Formula 1:

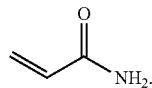

Chemical Formula 1

9. The method of claim 7, wherein the second display panel and the polarizing plate are manufactured through a single process.

10. The method of claim 7, wherein the second alignment layer is cured at a temperature of 220 to 240 degrees Celsius for 900 to 1200 seconds.

11. The method of claim 7, wherein in the coating and curing of the transfer layer on the carrier substrate, the transfer layer is in close contact with the carrier substrate, no laser is used in the removing of the carrier substrate, and the removing of the carrier substrate is performed through a process of attaching a passivation film on the second alignment layer.

* * * * *